UNITED STATES PATENT OFFICE.

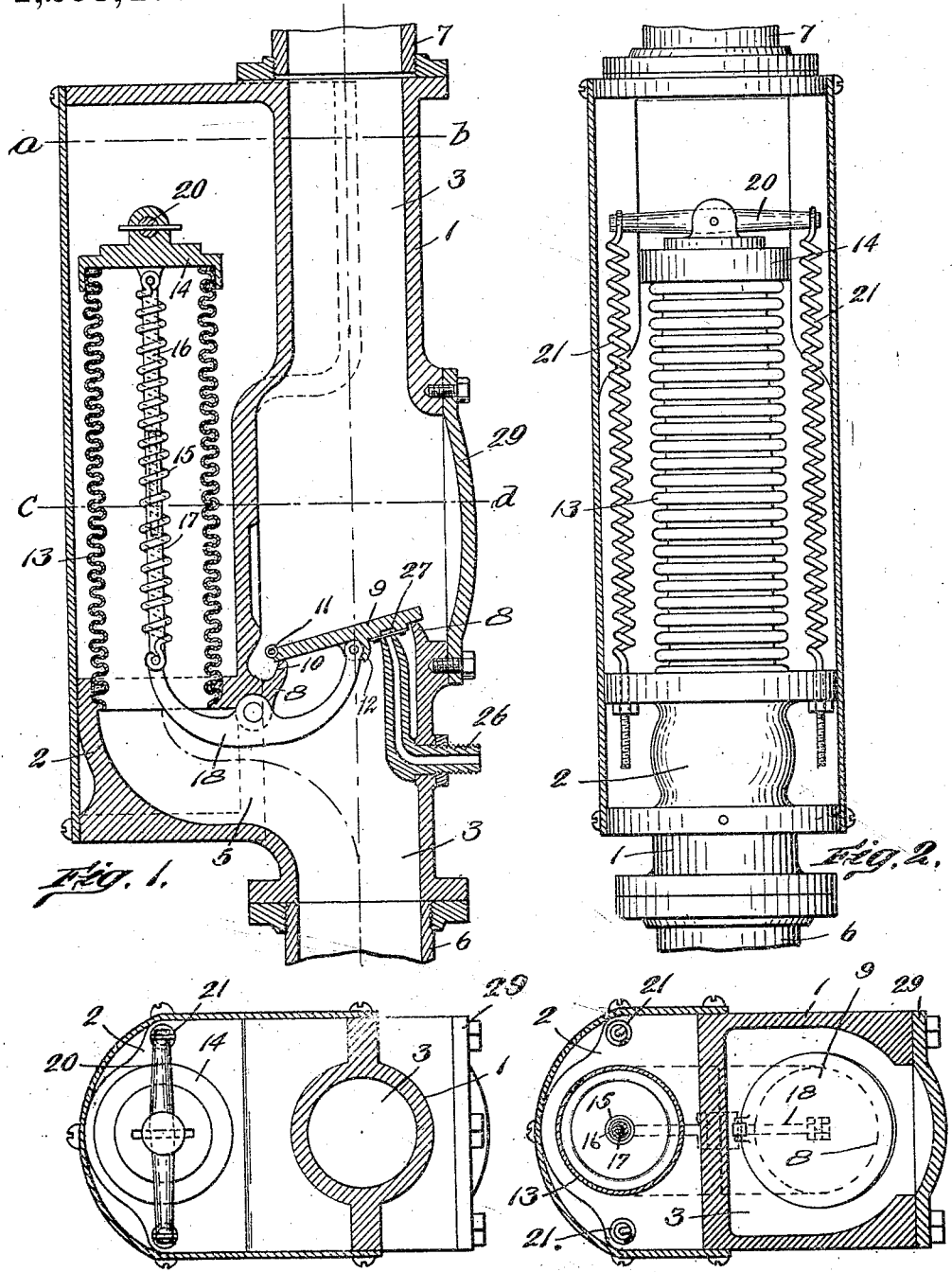

NATHAN H. SUREN, OF NEEDHAM, MASSACHUSETTS, ASSIGNOR TO GAMEWELL FIRE ALARM TELEGRAPH COMPANY, OF NEW YORK, N. Y., A CORPORATION OF NEW YORK.

AUTOMATIC VALVE.

1,205,408.      Specification of Letters Patent.      Patented Nov. 21, 1916.

Original application filed April 6, 1914, Serial No. 829,886. Divided and this application filed June 14, 1915. Serial No. 33,936.

*To all whom it may concern:*

Be it known that I, NATHAN H. SUREN, a citizen of the United States, residing at Needham, in the county of Norfolk and State of Massachusetts, have invented an Improvement in Automatic Valves, of which the following is a specification.

This invention relates to automatic valves designed to be used in connection with sprinkler and other systems, being a division of my application Ser. No. 829,886, filed April 6, 1914.

The invention has for its object the provision of means associated with a check-valve which is arranged between the supply and service sides of the system, and by which said check-valve is permitted to open upon a reduction in the pressure in the service-pipe, and to be closed automatically when the pressure in said service-pipe is restored, said means serving as balancing means for the valve. Also in the provision of a pressure-controlled element operatively connected with the check-valve which is operated by the supply pressure and controlled by the service pressure, whereby the check-valve is permitted to open upon the occurrence of a reduction in the pressure in the service-pipe, and to be automatically closed when the pressure in said pipe is restored, said pressure-controlled element serving as balancing means for the valve. Also in the provision of a yielding connection between the check-valve and pressure-controlled element, whereby the check-valve is caused to remain in engagement with its seat, or to be immediately restored if lifted by sudden or momentary fluctuations in the pressure due to water-hammer and the like.

Figure 1 is a central vertical section through the automatic valve, the parts being shown in elevation. Fig. 2 is a side elevation with the end wall removed. Fig. 3 is a horizontal section on line A—B of Fig. 1. Fig. 4 is a horizontal section on line C—D of Fig. 1.

In the embodiment of my invention, as here shown, 1 represents a casing having a conduit or passage 3, through it. The supply-pipe 6 communicates with the inlet end, and the service-pipe 7 communicates with the outlet end of said casing, so that the conduit 3, constitutes a direct means of communication between the supply-pipe and service-pipe. Near the lower end-portion of the casing 1, and within the conduit an inwardly extending annular lip 8 is formed, which serves as a valve-seat, and said seat is preferably inclined with respect to the transverse line of the case.

A pivotally supported check-valve 9 is arranged to coöperate with the seat 8, and when in engagement therewith, the continuity of the conduit 3 is interrupted. The wall of the conduit 3, adjoining the seat 8, is formed with a recess 10, and the check-valve 9 has arranged on it above said recess, a roll 11, which projects from the edge thereof and when the check-valve is raised said roll will enter and move in said recess thereby to guide and assist in supporting the check-valve; and said check-valve also has a downwardly extended ear 12, engaging its pivotal connection which also assists in guiding and supporting it, particularly against downward movement, when elevated.

At the lower end-portion of the casing a lateral extension 2 is provided having a passage 5 through it communicating at one end with the conduit 3, and its other end has fitted into it an extensible element 13, in the form of a cylindrical body having a convoluted wall to admit of longitudinal extension and contraction thereof. The opposing end of the cylinder is closed by a cap 14, having a surface area within the cylinder approximating the surface area of the check-valve 9. The cap 14 is directly connected to the check-valve through the medium of a rod composed of telescopically arranged sections 16 and 17, one end of the rod being centrally connected to the cap and the opposing end to one end of a lever 18, fulcrumed at a point intermediate its length on suitably formed ears arranged on the casing, the opposing end of the lever being pivotally connected to the supply side of the check-valve. A spring 15 encircles said center-rod 16, 17, which is connected at its upper end with the cap 14, and at its lower end with the lever 18, said spring acting contractively to shorten the connections between the cap and check-valve and thereby hold the sections 16 and 17 of the telescopic rod abutted together at their adjacent ends and the check-valve on its seat or to restore it in case it is lifted by a sudden or momentary change in the pressure.

The cap 14 is provided in its upper portion with a cross-bar 20 to the terminals of which are connected springs 21, 21, secured at their lower ends in any adjustable manner to the wall of the case, as shown in Fig. 2. These springs act to oppose the extension of the cylinder 13, and are adjusted to hold the cap in a predetermined position with the check-valve closed upon its seat at a minimum predetermined pressure in the service pipe.

An alarm-motor service-pipe 26 leads into the conduit 3, and has its upper open end controlled by a diaphragm 27 carried by the check-valve 9. The wall of the case above the check-valve is or may be formed with a side-opening adapted to be closed by a removable cover 29, to provide access to the interior of the case when desired.

When the sprinkler-system is empty, the check-valve 9 is positively held open due to the contractive force of the springs 21, 21, and the contractive movement of the cylinder 13, and the consequent operation of the lever 18. When the water is first turned on the conduit 3 provides a means for delivering it to the sprinkling-system beyond the casing until such system is filled. Immediately succeeding the filling of the system, the incoming water fills the cylinder 13, and extends the same against the pull of the springs 21, and against the inherent resiliency of the cylinder. This extensive movement of the cylinder continues until the cap 14 has been moved to a position, wherein, through the medium of the center-rod and lever 18, the check-valve 9 is actuated to close upon its seat. This is the normal position of the parts.

When the check-valve is closed upon its seat it is substantially balanced by the pressure upon both sides of it, and as said check-valve is of substantially the same area as the cap 14, the pressures acting thereupon will tend to hold the check-valve inert. When the pressure in the service-pipe or other adjunct of the sprinkler-system becomes subnormal from any cause, the normal balance of the check-valve is destroyed. In this connection is to be explained that there are two forces opposing the opening of the valve and two forces which tend to cause the opening of the valve. The first two forces; namely, those tending to close or seat the valve, are the pressure in the service pipes acting against the service side of the valve, and the pressure in the supply side of the system acting against the member 14. The other two forces; namely, those tending to open the valve, are the pressure on the supply side of the valve 9 and the springs 21. As stated the members 14 and 9 are of approximately equal area and the force acting directly against the valve 9 from the supply side of the system is therefore neutralized by the opposing pressure against the member 14. The springs 21 are of such retractive strength that the pull which they exert is equal to the force exerted under normal conditions by the pressure in the service pipes against the service side of the valve 9. Thus the tendency of the springs 21 to normally contract the extensible member 13 and thereby open the valve 9 is, under normal conditions, neutralized by the pressure in the service pipes which acts against the valve 9, and the valve is thus, under normal conditions, balanced and maintained in closed position. Should the pressure in the service pipes become subnormal, however, it is obvious that while the forces of pressure acting against the supply side of the valve and the member 14 will balance each other, the springs 21, being unbalanced, will act to contract the member 13, and thereby open the valve. As the valve commences to open the pressure in the supply pipe will be expended by forcing the water into the service pipes and the pressure acting against the member 14 will be thereby reduced, consequently lessening the opposition to the contracting of the springs 21 and hastening of the opening of the valve. In case the pressure in the supply-pipe becomes sub-normal from any cause the pressure in the service-pipe will hold the check-valve on its seat, and through the intermediate connections between said valve and the cap 14, said cap will be held in its normal position, notwithstanding the pressure in the cylinder is reduced. By the connection of the check-valve 9 with the cap 14 through the telescopic-rod connection, and the spring 15, it will be seen that upon a sudden lifting movement of the check-valve 9, due to a momentary fluctuation of the pressure, as from water-hammer or other cause, the sections of the telescopic-rod will be separated and the spring 15 will be extended, and upon a sudden lifting movement of the cap 14, from a like cause, said sections of the rod will be separated and the springs 15 and 21 and the corrugated cylinder will or may be extended, but immediately upon cessation of the increased pressure the aforesaid parts will return to normal, so that the valve is immediately restored or is held on its seat.

I claim:—

1. An automatic valve for sprinkler-systems or the like including a balanced automatic check-valve controlling direct communication between the supply and service sides of the system, and movable balancing means responsive to the pressure of the supply side of the system, and means flexibly connecting said balancing means with the check-valve.

2. An automatic valve for sprinkler-systems and the like including a casing formed to provide a conduit forming a communication between the supply and service sides of the system, a check-valve arranged in the conduit, an expansible actuator in open communication with the pressure from the supply side of the system, and means to flexibly connect said actuator with said check-valve.

3. An automatic valve for sprinkler-systems and the like including a casing formed to provide a conduit forming a communication between the supply and service sides of the system, a check-valve arranged in the conduit, a corrugated cylinder closed at one end and its other end being in open communication with the pressure from the supply side of the system, and means arranged within the cylinder to flexibly connect said cylinder with the check-valve.

4. An automatic valve for sprinkler-systems and the like including a casing formed to provide a conduit forming a communication between the supply and service sides of the system, a check-valve arranged in the conduit, an extensible cylinder open at its lower end to the pressure from the supply side of the system, a cap closing the upper end of the cylinder, and a yielding connection between the cap and valve, arranged within the cylinder and casing.

5. An automatic valve for sprinkler-systems and the like including a casing formed to provide a conduit forming a communication between the supply and service sides of the system, a check-valve arranged in the conduit, an extensible cylinder open at its lower end to the pressure from the supply side of the system, a cap closing the upper end of the cylinder, a lever supported within the casing and connected at one end to the valve, a telescopic rod connecting the opposing end of the lever with said cap, and a spring also connecting said opposing end of the lever and the cap.

6. An automatic valve for sprinkler-systems and the like including a casing formed to provide a conduit forming communication between the supply and service sides of the system, a check-valve arranged in the conduit, an extensible cylinder open at one end to the pressure from the supply side of the system and closed at the opposite end, a yielding connection between said cylinder and the check-valve, and springs connected with the cylinder and arranged to oppose extension thereof.

7. An automatic valve for sprinkler-systems and the like including a casing, a check-valve arranged in the casing and controlling passage of the fluid through the casing from the supply side to the service side of the system, an extensible cylinder open at one end to the pressure from the supply side of the system and closed at the opposite end, a lever supported within the casing and connected at one end to the valve, a telescopic rod connecting the opposing end of the lever and the closed end of the casing.

8. An automatic valve for sprinkler-systems and the like including a casing, a check-valve therein and controlling passage of the fluid through the casing from the supply side to the service side of the system, an extensible cylinder open at one end to the pressure supply side of the system, a cap closing the opposite end of the cylinder, a lever supported within the casing and connected at one end to the valve, and a spring-controlled telescopic rod connecting the opposing end of the lever and the cap.

9. An automatic valve for sprinkler-systems and the like including a casing, a check-valve therein and controlling the passage of the fluid through the casing from the supply side to the service side of the system, an extensible cylinder open at one end to the pressure supply side of the system, a cap closing the opposite end of the cylinder, a lever supported within the casing and connected at one end to the valve, a spring-controlled telescopic rod connecting the opposing end of the lever and the cap, and springs mounted to oppose the extensible movement of the cylinder.

10. An automatic valve for sprinkler-systems and the like including a casing formed to provide a conduit forming communication between the supply and service sides of the system, a check-valve arranged in the conduit, an extensible cylinder opening at its lower end to the pressure from the supply side of the system, a cap closing the upper end of the cylinder, and movably bodily as the cylinder is extended and retracted, a yielding connection between the cap and valve, said cap and valve presenting substantially equal areas to the pressure in all positions they occupy and springs connected with said cylinder and normally urging its retraction and through the yielding connection urging the valve open.

11. An automatic valve for sprinkler-systems and the like including a casing formed to provide a conduit forming communication between the supply and service sides of the system, a check-valve arranged in the conduit, a pressure-controlled element open to the pressure from the supply side of the system and arranged to control an alarm, a yielding connection between the said pressure-controlled element and the check-valve involving a pivoted lever to which the check-valve is pivotally connected, and means arranged to guide and assist in supporting said check-valve during its movements.

12. A valve including a valve-casing, a valve-member movable therein, and expansible balancing means yieldably connected to the valve and exposed to the pressure on the intake side of the valve.

13. A valve including a valve-casing, a valve-member movable therein, expansible balancing means yieldably connected to the valve and exposed to the pressure on the intake side of the valve, and yieldable means arranged to oppose the expansion of said expansible balancing means.

14. The combination with a fluid conduit of a valve including a valve-casing interposed in the conduit, a valve-member, an expansible balancing-member exposed to the pressure on the intake side of the valve, a lever freely connected to the valve, yieldable means connecting the free end of the lever and the expansible balancing member, and yieldable means arranged to oppose the expansion of the expansible balancing member.

In testimony whereof, I have signed my name to this specification in the presence of two subscribing witnesses.

NATHAN H. SUREN.

Witnesses:
H. B. Davis,
C. L. Erickson.